F. PEABODY.
Sled.
No. 57,959.  Patented Sept 11, 1866.
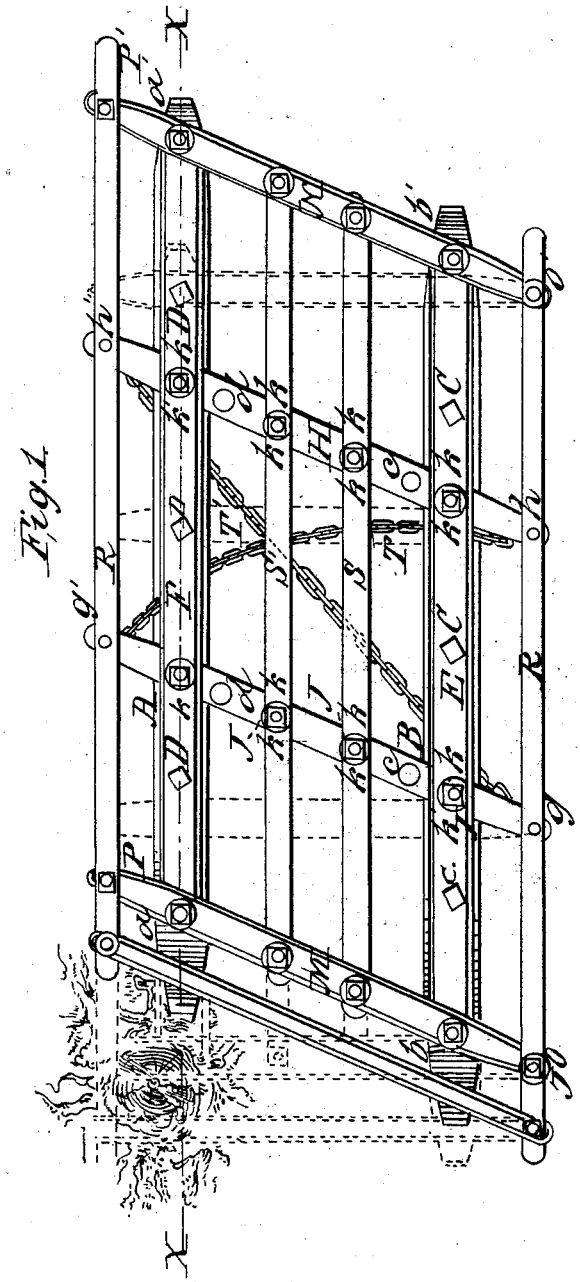
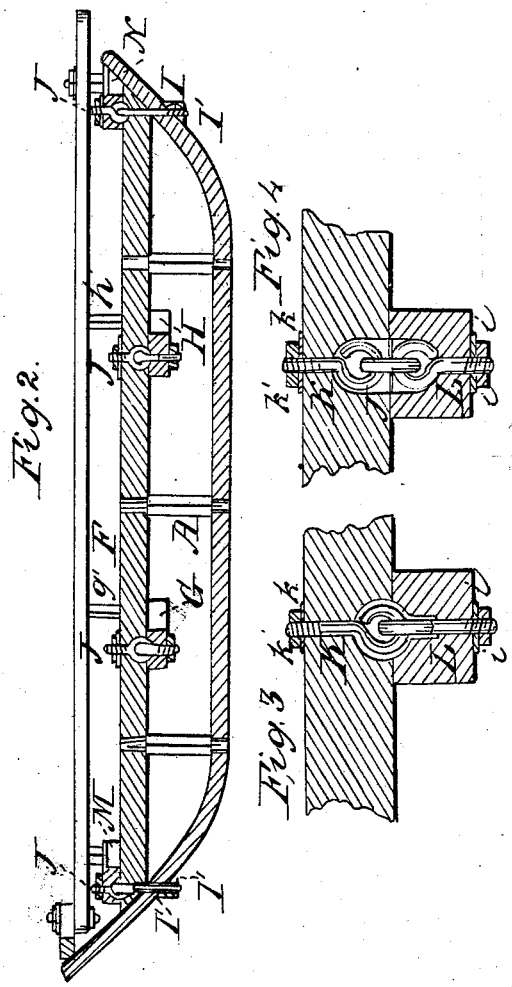
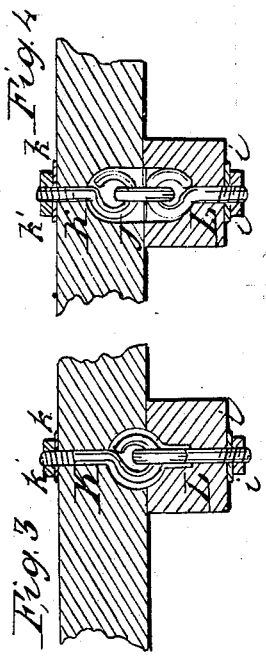
Witnesses:  Inventor:

UNITED STATES PATENT OFFICE.

FRANCIS PEABODY, OF VEVAY, INDIANA.

IMPROVEMENT IN SLEDS.

Specification forming part of Letters Patent No. 57,959, dated September 11, 1866.

*To all whom it may concern:*

Be it known that I, FRANCIS PEABODY, of Vevay, Switzerland county, Indiana, have invented certain new and useful Improvements in Sleds; and I do hereby declare the following to be a full, clear, and exact description thereof, reference being had to the accompanying drawings, making part of this specification.

The first part of my invention consists in connecting the different parts of a sled frame or body together by means of eyebolts or links, by which means the sled is converted into a flexible instead of a rigid vehicle, thus allowing it to yield temporarily to a stump or other immovable obstacle, and to accommodate itself to the inequalities of the ground or roads without straining the frame, and enabling it to be started with the least amount of exertion.

The second part of my invention consists in mounting the said flexible frame on double-ended runners, whereby the sled may be moved in an opposite direction by simply attaching the team to the other end of the vehicle, thus avoiding the great strain which is brought to bear upon the frame by turning the sled bodily around.

In the accompanying drawings, Figure 1 is a plan of a sled provided with my improvements. Fig. 2 is a vertical longitudinal section of the same on the line X X of Fig. 1, and Figs. 3 and 4 are views of the different forms of eyebolts on an enlarged scale.

A and B are the runners of the sled, both ends of which are bent up, as shown at $a\ a'$ and $b\ b'$, thus producing the double-ended runners. Firmly secured to the double-ended runners A B are a series of vertical knees, C D, and of inclined ones, $c\ d$, and the upper ends of said vertical knees C D are mortised into the raves E F, while the upper ends of the inclined ones, $c\ d$, connect with the transverse beams G and H.

The raves E F are connected to the double-ended runners A B, and also to the transverse beams G H, by means of the flexible eyebolts J, which consist of upper and lower screw-threaded shanks, K and L, each shank being provided with washers $k\ l$ and nuts $k'\ l'$, as more clearly shown in Fig. 3; but, if preferred, the two shanks K L may be attached to a central link, I, as shown in Fig. 4. Attached to the ends of the raves E F are two cross-bars, M and N, which support the washers O O' and P P, upon which rest the rack-raves R R, the members E F, M N, O O', P P', and R R' all being connected together by the flexible eyebolts J. The rack-raves R R' also rest upon standards $g\ g'$ and $h\ h'$, which rise vertically from the ends of the transverse beams G H, and the bed of this rack consists of a series of longitudinal strips, S S', which are attached to the beams G H and bars M N.

The opposite ends of the transverse beams G and H are connected together by flexible diagonal braces T T', which may consist of chains, ropes, or any other suitable material, and it is preferred that all of the principal timbers of the sled should have an elliptical form in order that they may glance off from any obstruction which the sled might encounter.

Among many advantages resulting from my improvements, the following may be enumerated: First, the sled being flexible enables the team to start one side before the other, thus making the draft much easier on the horses; second, the flexibility of the frame allows the runners to adapt themselves to any inequality in the road, thereby obviating the tearing and wrenching to which ordinary sleds are subjected, besides which the sled will glance off and pass round obstructions without upsetting the load; third, the provision of the eyebolts with their accompanying nuts and washers enables the sled to be taken apart in a few minutes for the purpose of transportation, &c.; fourth, a sled constructed on my improved plan is light and simple; it can be built at a mere nominal cost, and is much more durable than the customary rigid and unyielding kind now used.

I claim herein as new and of my invention—

1. The eyebolts J, or their mechanical equivalents, in combination with the raves E F, transverse beams G H, and cross-bars M N, all arranged and operating substantially as herein described and specified.

2. In combination with the eyebolts J and self-adjusting frame E F G H M N, the flexible diagonal braces T T', for the purpose specified.

3. In combination with the elements of the two preceding clauses, the double-ended runners A $a\ a'$ B $b\ b'$, as described and set forth.

In testimony of which invention I hereunto set my hand.

FRANCIS PEABODY.

Witnesses:
  GEO. H. KNIGHT,
  JAMES H. LAYMAN.